United States Patent
Nanba et al.

(10) Patent No.: US 10,003,093 B2
(45) Date of Patent: Jun. 19, 2018

(54) FUEL CELL SYSTEM INCLUDING A FUEL CELL AND A CONTROLLER FOR CONTROLLING WATER VAPOR AMOUNT OR AVERAGE FLOW RATE OF A FUEL GAS

(75) Inventors: Ryoichi Nanba, Susono (JP); Yasushi Araki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 338 days.

(21) Appl. No.: 13/574,709

(22) PCT Filed: Jan. 28, 2011

(86) PCT No.: PCT/JP2011/051776
§ 371 (c)(1),
(2), (4) Date: Jul. 23, 2012

(87) PCT Pub. No.: WO2012/101818
PCT Pub. Date: Aug. 2, 2012

(65) Prior Publication Data
US 2013/0295477 A1    Nov. 7, 2013

(51) Int. Cl.
*H01M 8/04291* (2016.01)
*H01M 8/04746* (2016.01)
(Continued)

(52) U.S. Cl.
CPC ... *H01M 8/04291* (2013.01); *H01M 8/04089* (2013.01); *H01M 8/04388* (2013.01);
(Continued)

(58) Field of Classification Search
CPC ......... H01M 8/04097; H01M 8/04388; H01M 8/04402; H01M 8/04843; H01M 8/04828
See application file for complete search history.

(56) References Cited

U.S. PATENT DOCUMENTS 5,260,143 A * 11/1993 Voss .................. H01M 8/04029
                                                429/414
5,366,818 A * 11/1994 Wilkinson et al. ........... 429/414
(Continued)

FOREIGN PATENT DOCUMENTS

JP    A-2004-146230    5/2004
JP    A-2009-117066    5/2009
(Continued)

OTHER PUBLICATIONS

International Search Report issued in Application No. PCT/JP2011/051776; dated Apr. 5, 2011 (With Translation).

*Primary Examiner* — Maria Laios
*Assistant Examiner* — Robert S Carrico
(74) *Attorney, Agent, or Firm* — Oliff PLC

(57) ABSTRACT

A fuel cell system having a fuel cell operated under non-humidified conditions that includes a polymer electrolyte membrane sandwiched between an anode and a cathode, a fuel gas channel facing the anode to supply it with fuel gas, an oxidant gas channel facing the cathode to supply it with oxidant gas, and a flow direction of the fuel gas and the oxidant gas are opposite. The fuel cell system may control a water vapor amount at an outlet of the fuel gas channel based on a value that is set based on a relationship between a voltage of the fuel cell and the water vapor amount. The fuel cell system may control an average flow rate of the fuel gas in the fuel gas channel based on a value that is set based on a relationship between a voltage of the fuel cell and the average flow rate.

7 Claims, 8 Drawing Sheets

(51) Int. Cl.
  *H01M 8/04858* (2016.01)
  *H01M 8/04828* (2016.01)
  *H01M 8/04089* (2016.01)
  *H01M 8/0438* (2016.01)
  *H01M 8/04492* (2016.01)
  *H01M 8/04537* (2016.01)

(52) U.S. Cl.
  CPC ... *H01M 8/04514* (2013.01); *H01M 8/04552* (2013.01); *H01M 8/04746* (2013.01); *H01M 8/04828* (2013.01); *H01M 8/04873* (2013.01)

(56) References Cited

U.S. PATENT DOCUMENTS

| | | | | |
|---|---|---|---|---|
| 6,126,311 | A * | 10/2000 | Schuh | 374/21 |
| 2001/0005557 | A1 * | 6/2001 | Yosida et al. | 429/32 |
| 2001/0028970 | A1 * | 10/2001 | Sano et al. | 429/22 |
| 2001/0033960 | A1 * | 10/2001 | Cavalca | H01M 4/8642 |
| | | | | 429/431 |
| 2007/0218323 | A1 * | 9/2007 | Sudo | H01M 8/04089 |
| | | | | 429/413 |
| 2010/0285384 | A1 | 11/2010 | Nakagawa et al. | |
| 2011/0165487 | A1 * | 7/2011 | Mitsui | H01M 8/04201 |
| | | | | 429/432 |
| 2011/0200896 | A1 | 8/2011 | Hasegawa et al. | |

FOREIGN PATENT DOCUMENTS

| | | | | |
|---|---|---|---|---|
| JP | A-2009-193817 | 8/2009 | | |
| JP | A-2009-259758 | 11/2009 | | |
| JP | A-2010-114039 | 5/2010 | | |
| JP | A-2010-186696 | 8/2010 | | |
| JP | A-2010-205593 | 9/2010 | | |
| WO | WO 2010029721 A1 * | 3/2010 | ........ | H01M 8/04201 |
| WO | WO 2010/064366 A1 | 6/2010 | | |

\* cited by examiner

FUEL CELL SYSTEM INCLUDING A FUEL CELL AND A CONTROLLER FOR CONTROLLING WATER VAPOR AMOUNT OR AVERAGE FLOW RATE OF A FUEL GAS

TECHNICAL FIELD

The present invention relates to a fuel cell system comprising a solid polymer electrolyte fuel cell. Especially, it relates to a fuel cell system which operates the fuel cell under a non-humidified condition and which can avoid the inside of the fuel cell from being in a dry state even in high temperature operation and thus can stably generate electricity.

BACKGROUND ART

A fuel cell converts chemical energy directly to electrical energy by supplying a fuel and an oxidant to two electrically-connected electrodes and causing electrochemical oxidation of the fuel. Unlike thermal power generation, fuel cells are not limited by Carnot cycle, so that they can show high energy conversion efficiency. In general, a fuel cell is formed by stacking a plurality of single fuel cells each of which has a membrane electrode assembly as a fundamental structure, in which an electrolyte membrane is sandwiched between a pair of electrodes. Especially, a solid polymer electrolyte fuel cell which uses a solid polymer electrolyte membrane as the electrolyte membrane is attracting attention as a portable and mobile power source because it has such advantages that it can be downsized easily, operated at low temperature, etc.

In a solid polymer electrolyte fuel cell, the reaction represented by the following formula (A) proceeds at an anode electrode (fuel electrode) in the case of using hydrogen as fuel:

$$H_2 \rightarrow 2H^+ + 2e^- \quad \text{Formula (A)}$$

Electrons generated by the reaction represented by the formula (A) pass through an external circuit, work by an external load, and then reach a cathode electrode (oxidant electrode). Protons generated by the reaction represented by the formula (A) are, in the state of being hydrated and by electro-osmosis, transferred from the anode electrode side to the cathode electrode side through the solid polymer electrolyte membrane.

In the case of using oxygen as an oxidant, the reaction represented by the following formula (B) proceeds at the cathode electrode:

$$2H^+ + (1/2)O_2 + 2e^- \rightarrow H_2O \quad \text{Formula (B)}$$

Water produced at the cathode electrode passes through a gas channel and so on and is discharged to the outside. Accordingly, fuel cells are clean power source that produces no emissions except water.

In a solid polymer electrolyte fuel cell, the electricity generation performance is largely affected by the amount of water in the electrolyte membrane and electrodes. In particular, if the water (emission) is excessive, the water condensed inside the fuel cell fills a void in the electrodes and, further, the gas channels to interrupt the supply of reaction gases (fuel gas and oxidant gas), so that the reaction gases for electricity generation are not sufficiently distributed throughout the electrodes. As a result, there is a problem that there is an increase in concentration overvoltage and thus a decrease in power output and electricity generation efficiency of the fuel cell. On the other hand, if the water inside the fuel cell is insufficient and thus the electrolyte membrane and electrodes are dried, there is a decrease in proton ($H^+$) conductivity of the electrolyte membrane and electrodes. As a result, there is a problem that there is an increase in resistance overvoltage and thus a decrease in power output and electricity generation efficiency of the fuel cell.

Also in the solid polymer electrolyte fuel cell, a non-uniform distribution of water occurs in a plane direction of the electrolyte membrane (that is, a plane direction of the electrodes), which means that water is unevenly distributed in the plane direction of the electrolyte membrane. As a result, a non-uniform distribution of electricity generation occurs in the plane direction of the electrolyte membrane, resulting in a further uneven distribution of water and thus a decrease in power output and electricity generation efficiency of the fuel cell.

As described above, to realize a solid polymer electrolyte fuel cell with high power output and high electricity generation efficiency, appropriate water control is very important. In order to avoid water shortage, especially so-called drying up (dry-up), it is proposed to supply humidified reaction gases. In this case, however, the above problems due to excessive water are more likely to occur. In addition, as a result of equipping the fuel cell with a humidifier, the fuel cell becomes larger and the fuel cell system becomes complex, for example.

Therefore, there has been an attempt to obtain stable electricity generation performance by appropriately controlling the moisture state of the fuel cell under a non-humidified condition in which the reaction gases are not humidified.

For example, Patent Literature 1 discloses a fuel cell system which is operated under a non-humidified condition and/or high temperature condition and which prevents in-plane moisture distribution of a fuel cell from occurring by determining the dry state near the inlet of an oxidizing agent gas channel based on the resistance of the fuel cell, the voltage of the fuel cell, or the pressure loss of the oxidizing agent gas, and then controlling the flow rate or pressure of the fuel gas based on the determination.

As a technique for controlling the moisture state in the fuel cell, for example, Patent Literature 2 discloses a fuel cell system which comprises a current sensor for measuring an output current value of the fuel cell, a voltage sensor for measuring an output voltage value of the fuel cell, and a storage means for memorizing the relationship between the output voltage value and output current value, the relationship being the basis for determining whether the operation state of the fuel cell is an optimum operating state or not, which retrieves an optimum voltage value corresponding to the measured current value measured by the current sensor from the storage means, and which determines that the moisture state of the fuel cell is a dry state when the difference between the retrieved optimum voltage value and the measured voltage value measured by the voltage sensor is larger than the preset threshold value.

Patent Literature 3 discloses a fuel cell system which comprises a measuring device for measuring voltage in a plurality of measuring points of the fuel cell, and which estimates the uneven distribution of water in the fuel cell based on the difference of moisture contents between the plurality of measuring points, which were estimated from the difference of the voltage values measured in different measuring points.

Patent Literature 4 discloses a fuel cell system which determines whether the execution condition for performing the moisture content state determination of the fuel cell is filled or not from the time sequential change of voltage of the fuel cell based on the drop width of voltage corresponding to transitional load increase, and which determines the moisture state of the fuel cell when the execution condition is determined to be filled, based on the drop width of the voltage and the time sequential change of the electric resistance of the fuel cell.

CITATION LIST

Patent Literature

Patent Literature 1: Japanese Patent Application Laid-Open (JP-A) No. 2009-259758
Patent Literature 2: JP-A No. 2010-114039
Patent Literature 3: JP-A No. 2009-193817
Patent Literature 4: JP-A No. 2009-117066

SUMMARY OF INVENTION

Technical Problem

However, it is not possible for the moisture control technique of conventional fuel cells to sufficiently avoid the occurrence of a dry state inside them. For example, the technique disclosed in Patent Literature 1 can inhibit a dry-up around the inlet of the oxidant gas channel which is likely to occur under a non-humidified condition or high temperature condition. However, the technique is a feed back control which controls the flow rate and pressure of fuel gas based on the detected voltage and resistance of a fuel cell and pressure loss; therefore, the inside of the fuel cell could be temporarily in a dry state. Once the electrolyte membrane or electrodes of the fuel cell are in a dry state (dry-up), there are problems that it takes time to be in the optimum moisture state, that is, recovery of electricity generation performance takes time, and deterioration of the materials of the electrolyte membrane and electrodes is accelerated once they are in the dry state. Therefore, the occurrence of a dry-up inside the fuel cell should be avoided even if it is a temporary phenomenon.

In addition, the resistance of the fuel cell does not necessarily correspond to the voltage of the fuel cell. In particular, the peak voltage cannot be obtained at the lowest resistance. Therefore, there is a high possibility that the peak voltage cannot be obtained even though the flow rate and pressure of the fuel gas are controlled based on the resistance of the fuel cell as disclosed in Patent Literature 1.

Furthermore, it is essential for the fuel cell system disclosed in Patent Literature 1, etc. to have a cell monitor for measuring the voltage and resistance, so that the fuel cell system requires high cost and becomes complex.

The present invention was made in view of the above circumstances, and it is an object of the present invention to provide a fuel cell system which can control the moisture state inside the fuel cell so as to be in an optimum state that can provide high power output and prevent the occurrence of a dry-up.

Solution to Problem

The first fuel cell system of the present invention comprises a fuel cell and is operated under a non-humidified condition,
the fuel cell comprising:
a polymer electrolyte membrane sandwiched between an anode electrode and a cathode electrode,
a fuel gas channel disposed so as to face the anode electrode in order to supply the anode electrode with fuel gas containing at least a fuel component, and
an oxidant gas channel disposed so as to face the cathode electrode in order to supply the cathode electrode with oxidant gas containing at least an oxidant component,
wherein a flow direction of the fuel gas in the fuel gas channel and a flow direction of the oxidant gas in the oxidant gas channel are opposite; and
wherein the fuel cell system has a water vapor amount control means which controls a water vapor amount at an outlet of the fuel gas channel based on a target value of the water vapor amount which is preliminarily set based on a relationship between a voltage of the fuel cell and the water vapor amount.

According to the first fuel cell system, it is possible to appropriately control the moisture content in the plane direction of the electrolyte membrane of the fuel cell so that uniform electricity generation proceeds in the plane direction; furthermore, it is possible to avoid the occurrence of a dry state inside the fuel cell since the first fuel cell system is a feedforward control which controls the water vapor amount based on the target value of the water vapor amount.

In the first fuel cell system, the water vapor amount control means can control at least one of a temperature of the fuel cell and a flow rate and pressure of the fuel gas in the fuel cell, for example, based on the target value of the water vapor amount.

In the first fuel cell system, the water vapor amount control means can control the flow rate and/or pressure of the fuel gas in the fuel cell, for example, based on the target value of the water vapor amount.

In the first fuel cell system, the water vapor amount control means can control at least one of the temperature of the fuel cell and the flow rate and pressure of the fuel gas in the fuel cell, for example, based on a map obtained based on a correlation between the target value of the water vapor amount and at least one of the fuel gas flow rate, fuel gas pressure and fuel cell temperature.

As described above, in the case where the water vapor amount is controlled based on the map, additional means such as a measuring means for controlling water vapor amount is not required. Therefore, a simplification of the fuel cell system and cost reduction are possible.

Or, in the case where the first fuel cell system comprises a water vapor amount measuring means for measuring the water vapor amount, the water vapor amount control means can control at least one of the temperature of the fuel cell and the flow rate and pressure of the fuel gas in the fuel cell so that the water vapor amount measured by the water vapor amount measuring means is brought closer to the target value of the water vapor amount.

In the case where the first fuel cell system comprises a fuel gas supply path which supplies the fuel component gas to the fuel gas channel from a fuel supply means, a fuel gas circulating path which recirculates fuel gas discharged from the fuel cell to the fuel gas supply path, and a recirculation pump which is installed in the fuel gas circulating path and recirculates the discharged fuel gas to the fuel gas supply path, the water vapor amount control means can control the flow rate of the fuel gas in the fuel cell by controlling the flow rate of the discharged fuel gas recirculated by the recirculation pump.

In the first fuel cell system, the water vapor amount control means can control the pressure of the fuel gas at the inlet of the fuel gas channel and/or the pressure of the fuel gas at the outlet of the fuel gas channel, for example, based on the target value of the water vapor amount.

The second fuel cell system of the present invention comprises a fuel cell and is operated under a non-humidified condition, the fuel cell comprising:

a polymer electrolyte membrane sandwiched between an anode electrode and a cathode electrode, a fuel gas channel disposed so as to face the anode electrode in order to supply the anode electrode with fuel gas, and an oxidant gas channel disposed so as to face the cathode electrode in order to supply the cathode electrode with oxidant gas, wherein a flow direction of the fuel gas in the fuel gas channel and a flow direction of the oxidant gas in the oxidant gas channel are opposite; and wherein the fuel cell system has an average flow rate control means which controls an average flow rate of the fuel gas in the fuel gas channel based on a target value of the average flow rate which is preliminarily set based on a relationship between a voltage of the fuel cell and the average flow rate.

The inventors of the present invention have found out that the average flow rate has a correlation with the water vapor amount, and the moisture content in the fuel cell can be appropriately controlled by controlling the average flow rate as with the case of controlling the water vapor amount. In particular, according to the second fuel cell system, it is possible to appropriately control the moisture content in the plane direction of the electrolyte membrane of the fuel cell so that uniform electricity generation proceeds in the plane direction; furthermore, it is possible to avoid the occurrence of a dry state inside the fuel cell since the second fuel cell system is a feedforward control which controls the water vapor amount based on the target value of the water vapor amount.

In the second fuel cell system, the average flow rate control means can control at least one of a temperature of the fuel cell and a flow rate and pressure of the fuel gas in the fuel cell, for example, based on the target value of the average flow rate.

In the second fuel cell system, the average flow rate control means can control the flow rate and/or pressure of the fuel gas in the fuel cell, for example, based on the target value of the average flow rate.

In the second fuel cell system, the average flow rate control means can control at least one of the temperature of the fuel cell and the flow rate and pressure of the fuel gas in the fuel cell, based on a map obtained based on a correlation between the target value of the average flow rate and at least one of the fuel gas flow rate, the fuel gas pressure and fuel cell temperature.

In the case where the second fuel cell system comprises a fuel gas supply path which supplies the fuel component gas to the fuel gas channel from a fuel supply means, a fuel gas circulating path which recirculates fuel gas discharged from the fuel cell to the fuel gas supply path, and a recirculation pump which is installed in the fuel gas circulating path and recirculates the discharged fuel gas to the fuel gas supply path, the average flow rate control means can control the flow rate of the fuel gas in the fuel cell by controlling the flow rate of the discharged fuel gas recirculated by the recirculation pump.

In this case, the average flow rate can be calculated, for example, by the following formula (1):

$$Q_{ave}=Q_a+Q_b/2 \qquad \text{Formula (1)}$$

$Q_{ave}$: Average flow rate of the fuel gas in the fuel gas channel $Q_a$: Flow rate of the discharged fuel gas recirculated by the recirculation pump $Q_b$: Flow rate of the fuel component gas supplied from the fuel supply means Or, in the second fuel cell system, the average flow rate can be calculated, for example, by the following formula (2):

$$Q_{ave}=nRT/P \qquad \text{Formula (2)}$$

$Q_{ave}$: Average flow rate of the fuel gas in the fuel gas channel n: Number of moles of the fuel gas in the middle of the overall length of the fuel gas channel R: Gas constant T: Fuel cell temperature P: Pressure of the fuel gas in the middle of the overall length of the fuel gas channel In this case, in formula (2), n can be calculated based on the assumption that, of the fuel component contained in the fuel gas supplied to the fuel gas channel, half of the minimum fuel component required for an amount of electricity generated by the fuel cell is consumed, and p can be calculated by the following formula (3):

$$P=(P_{in}+P_{out})/2 \qquad \text{Formula (3)}$$

$P_{in}$: Pressure of the fuel gas at the inlet of the fuel gas channel $P_{out}$: Pressure of the fuel gas at the outlet of the fuel gas channel Or, in the case where the second fuel cell system comprises a fuel gas supply path which supplies the fuel component gas to the fuel gas channel from a fuel supply means, a fuel gas circulating path which recirculates fuel gas discharged from the fuel cell to the fuel gas supply path, and a recirculation pump which is installed in the fuel gas circulating path and recirculates the discharged fuel gas to the fuel gas supply path, the average flow rate can be calculated by the following formula (4):

$$Q_{ave}=n'RT/P \qquad \text{Formula (4)}$$

$Q_{ave}$: Average flow rate of the fuel gas in the fuel gas channel n': Number of moles of the fuel gas in the middle of the overall length of the fuel gas channel, which is calculated based on the assumption that of the fuel gas which is supplied to the fuel gas channel, half of the fuel component which is supplied to the fuel gas channel from the fuel gas supply means, is consumed.

R: Gas constant

T: Fuel cell temperature

P: Pressure of the fuel gas in the middle of the overall length of the fuel gas channel, which is calculated by the following formula (3):

$$P=(P_{in}+P_{out})/2 \qquad \text{Formula (3)}$$

$P_{in}$: Pressure of the fuel gas at the inlet of the fuel gas channel $P_{out}$: Pressure of the fuel gas at the outlet of the fuel gas channel In the second fuel cell system, the average flow rate control means can control the pressure of the fuel gas at the inlet of the fuel gas channel and/or the pressure of the fuel gas at the outlet of the fuel gas channel, based on the target value of the average flow rate.

In the first and second fuel cell systems, even though the fuel cell has a temperature of 80° C. or more, it is possible to prevent the occurrence of the dry state and to provide a stable amount of electricity generation, Advantageous Effects of Invention The fuel cell system of the present invention can provide high voltage; moreover, it can prevent the occurrence of a dry-up, thereby showing a stable electricity generation performance even when operated under a high temperature condition. In the present invention, it is possible to employ a system structure requiring no cell monitor for measuring a voltage and resistance; therefore, a simplification of the fuel cell system and cost reduction are also possible.

DESCRIPTION OF EMBODIMENTS

The first fuel cell system of the present invention comprises a fuel cell and is operated under a non-humidified condition, the fuel cell comprising:

a polymer electrolyte membrane sandwiched between an anode electrode and a cathode electrode, a fuel gas channel disposed so as to face the anode electrode in order to supply the anode electrode with fuel gas containing at least a fuel component, and an oxidant gas channel disposed so as to face the cathode electrode in order to supply the cathode electrode with oxidant gas containing at least an oxidant component, wherein a flow direction of the fuel gas in the fuel gas channel and a flow direction of the oxidant gas in the oxidant gas channel are opposite; and wherein the fuel cell system has a water vapor amount control means which controls a water vapor amount at an outlet of the fuel gas channel based on a target value of the water vapor amount which is preliminarily set based on a relationship between a voltage of the fuel cell and the water vapor amount.

Also, the second fuel cell system of the present invention comprises a fuel cell and is operated under a non-humidified condition, the fuel cell comprising:

a polymer electrolyte membrane sandwiched between an anode electrode and a cathode electrode, a fuel gas channel disposed so as to face the anode electrode in order to supply the anode electrode with fuel gas, and an oxidant gas channel disposed so as to face the cathode electrode in order to supply the cathode electrode with oxidant gas, wherein a flow direction of the fuel gas in the fuel gas channel and a flow direction of the oxidant gas in the oxidant gas channel are opposite; and wherein the fuel cell system has an average flow rate control means which controls an average flow rate of the fuel gas in the fuel gas channel based on a target value of the average flow rate which is preliminarily set based on a relationship between a voltage of the fuel cell and the average flow rate.

As a result of diligent researches, the inventors of the present invention have found out that when a so-called counter-flow fuel cell, in which the flow direction of the fuel gas in the fuel gas channel and the flow direction of the oxidant gas in the oxidant gas channel are opposite, is operated under the non-humidified condition, it is possible to estimate the moisture state inside the fuel cell by a water vapor amount at an outlet of a fuel gas channel (fuel gas outlet water vapor amount) and to realize appropriate water control inside the fuel cell by knowing a fuel gas outlet water vapor amount upon showing a peak voltage; thereby, the fuel cell system of the present invention can provide high voltage.

Figure 1:
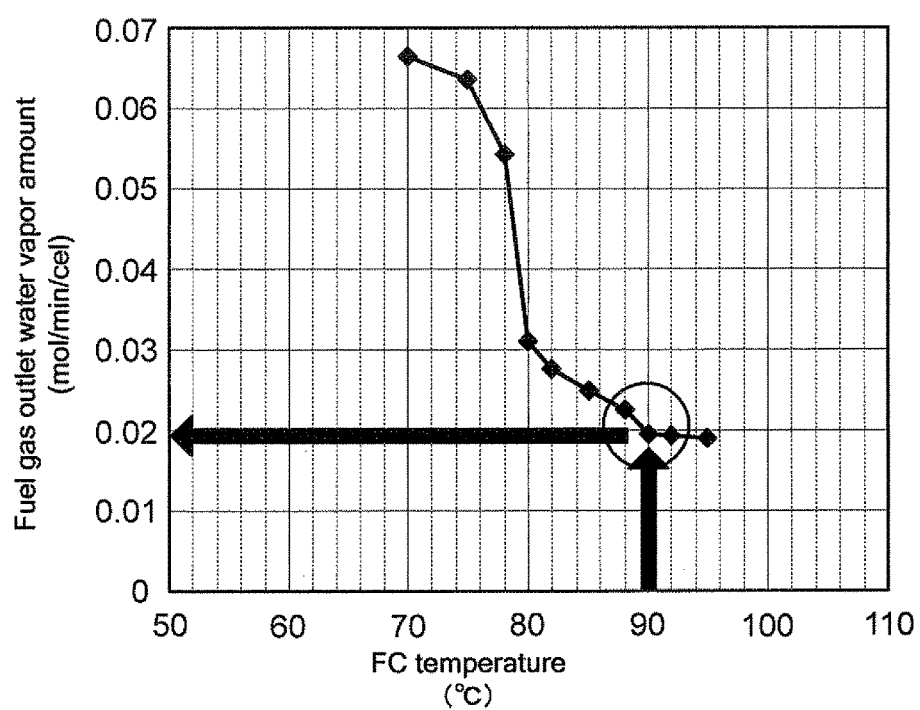
FIG. 1 is a graph showing a relationship between a fuel cell temperature and a fuel gas outlet water vapor amount in which a peak voltage is obtained.

In addition, the inventors of the present invention observed the relationship between the fuel gas outlet water vapor amount and the fuel cell temperature upon showing the peak voltage, and they have found out that when the fuel gas outlet water vapor amount is small as shown in FIG. 1, the peak voltage can be obtained. It can be understood from FIG. 1 that the peak voltage can be obtained when the amount of water vapor discharged from the fuel gas outlet is small (from about 0.02 to about 0.067 mol/min) under the condition of a fuel cell temperature of 70° C. or more, particularly 80° C. or more.

Figure 2:
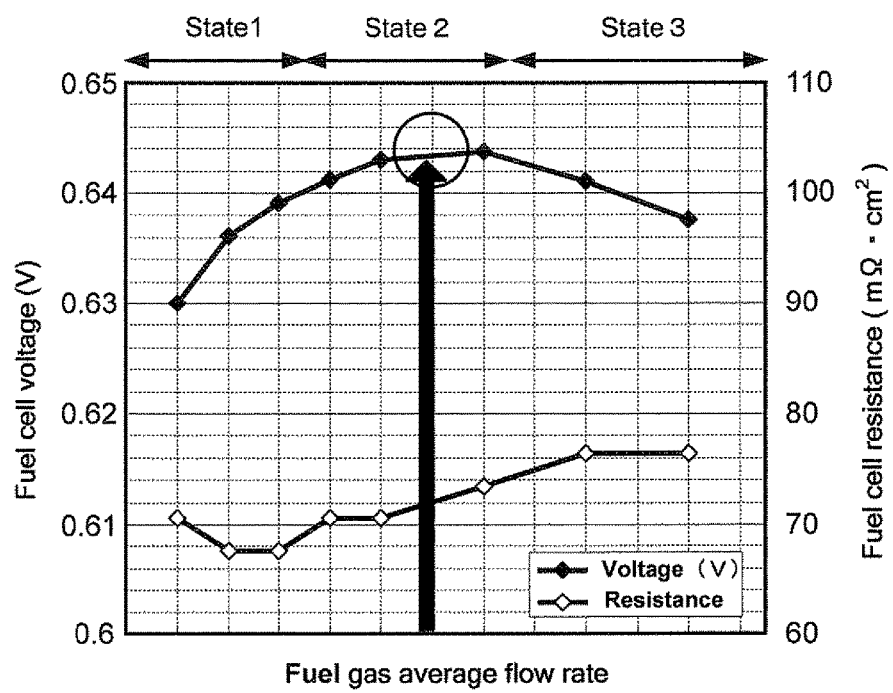
FIG. 2 is a graph showing a relationship between "fuel gas average flow rate" and "fuel cell voltage and fuel cell resistance".

Furthermore, as shown in FIG. 2, the fuel gas outlet water vapor amount was measured while measuring the voltage and resistance of the fuel cell when the fuel gas average flow rate is changed. Therefore, in states 1 to 3 in FIG. 2, the following relationships between "fuel gas outlet water vapor amount" and "fuel cell voltage and fuel cell resistance" were observed.

In particular, when the amount of water vapor discharged from the fuel gas channel outlet (hereinafter may be referred to as fuel gas outlet water vapor amount) is very small, the fuel cell voltage is decreased (state 1).

The state in which, as just described, the fuel gas outlet water vapor amount is very small is a state in which a region around an inlet of the oxidant gas channel (that is, the region around the fuel gas channel outlet) in the plane direction of the electrolyte membrane of the fuel cell (that is, the plane direction of the electrodes and a direction perpendicular to the stacking direction of the electrolyte membrane and the electrodes) is dried; thus, no electricity is generated in the region. Electricity is intensively generated in a region around an outlet of the oxidant gas channel (that is, the region around the fuel gas channel inlet). At this time, water vapor on the anode electrode side moves to the cathode electrode side in a dry state to relieve dryness on the cathode electrode side; therefore, the fuel gas outlet water vapor amount is considered to be low. In the region around the oxidant gas channel inlet, there is an increase in resistance overvoltage due to drying, while there is an increase in concentration overvoltage in the region around the oxidant gas channel outlet due to a decrease in concentration of the oxidant component. It is considered that this is the reason why the fuel cell voltage becomes low.

When a small amount of water vapor is discharged from the fuel gas channel outlet, the fuel cell voltage is increased (state 2).

The state in which, as just described, a small amount of water vapor is discharged is a state in which the moisture state is uniform and excellent in the plane direction of the fuel cell, so that uniform electricity is generated in the plane. Therefore, there is a decrease in concentration overvoltage and, further, there is a decrease in resistance overvoltage in the region around the oxidant gas channel outlet. It is considered that this is the reason why high voltage is obtained.

When the amount of water vapor discharged from the fuel gas channel outlet is large, the fuel cell voltage is decreased (state 3).

In the state in which, as just described, the fuel gas outlet water vapor amount is large, the region around the oxidant gas channel inlet in the plane direction of the fuel cell is in a sufficient moisture state, and the concentration of the oxidant component in this region is sufficient; therefore, it is considered that electricity is intensively generated in this region. On the other hand, the region around the fuel gas channel inlet (that is, the region around the oxidant gas channel outlet) is dried because moisture is carried off by fuel gas to the fuel gas channel outlet side and the concentration of the oxidant component is low. Therefore, there is an increase in both resistance overvoltage and concentration overvoltage. As a result, a uniform distribution of electricity generation cannot be obtained in the plane. It is considered that this is the reason why the fuel cell voltage is decreased.

In the plane direction of the fuel cell, there is no one-to-one correspondence between an increase and decrease in concentration overvoltage and an increase and decrease in resistance overvoltage. Therefore, as shown in FIG. 2, the operating condition showing bottom resistance does not correspond to the operating condition showing the peak voltage. In particular, even though the operating condition of the fuel cell is controlled by the detection of the bottom resistance, the operating condition in which the peak voltage can be obtained is not necessarily obtained, so that there could be a decrease in electricity generation efficiency. When the fuel cell operating condition is controlled based on the detected voltage and resistance, a region which can be temporarily in a dry-up state could highly occur in the fuel cell because of control delay. The region which is temporarily in the dry-up state takes time to recover its electricity generation performance, or the electricity generation performance may not recover.

Based on the above knowledge, the inventors of the present invention have found out that the fuel gas outlet water vapor amount in which high voltage can be obtained is preliminarily obtained based on the relationship between the fuel cell voltage and fuel gas outlet water vapor amount, and the water vapor amount at the outlet of the fuel gas channel is controlled using the thus-obtained water vapor amount as a target value; therefore, it is possible to appropriately control the moisture content in the plane direction of the electrolyte membrane of the fuel cell so that the uniform electricity generation proceeds in the plane direction. Furthermore, they have found out that, as a result of the above-mentioned appropriate control of the moisture content, it is possible to obtain a fuel cell system which shows stable and high power output and prevents the occurrence of a dry-up, and, further inhibits a decrease in electricity generation efficiency. Thus, the inventors have achieved the first fuel cell system of the present invention.

The inventors of the present invention have found out that there is a high correlation between the fuel gas outlet water vapor amount and the average flow rate of the fuel gas in the fuel gas channel (hereinafter may be referred to as fuel gas average flow rate). That is, they obtained the following knowledge: as shown in FIG. 2, when the average flow rate of the fuel gas in the fuel gas channel is low, the fuel gas outlet water vapor amount is small and the voltage of the fuel cell is low (the above-described state 1); when the fuel gas average flow rate is increased higher than state 1, the fuel gas outlet water vapor amount is very small and the fuel cell can be a high voltage (the above-described state 2); and when the fuel gas average flow rate is further increased higher than state 2, the fuel gas outlet water vapor amount is large and the voltage of the fuel cell is low (the above-described state 3).

Figure 3:
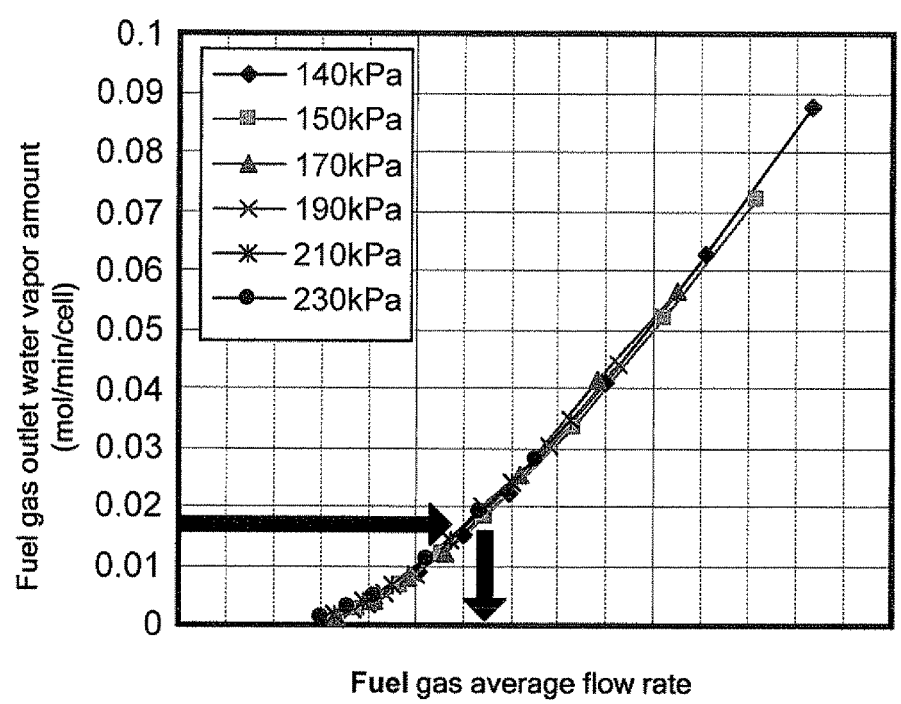
FIG. 3 is a graph showing a relationship between the fuel gas outlet water vapor amount and the fuel gas average flow rate.

Furthermore, as shown in FIG. 3, since a consistent correlation is shown between the fuel gas outlet water vapor amount and the fuel gas average flow rate regardless of the pressure of the fuel gas in the fuel gas channel, the inventors of the present invention have found out that it is possible to indirectly control the fuel gas outlet water vapor amount by controlling the fuel gas average flow rate.

Based on the above knowledge, the inventors of the present invention have found out that the fuel gas average flow rate in which high voltage can be obtained is preliminarily obtained based on the relationship between the fuel cell voltage and fuel gas average flow rate, and the fuel gas average flow rate in the fuel gas channel is controlled using the thus-obtained average flow rate as a target value; therefore, it is possible to appropriately control the moisture content in the plane direction of the electrolyte membrane of the fuel cell so that the uniform electricity generation proceeds in the plane direction. Furthermore, they have found out that it is possible to obtain a fuel cell system which shows stable and high power output and prevents the occurrence of a dry-up, and, further inhibits a decrease in electricity generation efficiency. Thus, the inventors have achieved the second fuel cell system of the present invention.

Hereinafter, the fuel cell system of the present invention will be described with reference to figures.

The purpose of the fuel cell system of the present invention is not particularly limited and is usable, for example, as a source of electricity for driving mechanisms of transportation devices such as vehicles, vessels, or as a source of electricity for other various kinds of devices.

In the present invention, fuel gas is gas that contains a fuel component. It refers to gas that flows through the fuel gas channel in the fuel cell and it can contain a component other than the fuel component (e.g., water vapor, nitrogen gas). Oxidant gas is gas that contains an oxidant component. It refers to gas that flows through the oxidant gas channel in the fuel cell, and it can contain a component other than the oxidant component (e.g., water vapor, nitrogen gas). The fuel gas and oxidant gas may be collectively referred to as reaction gas.

Figure 4:
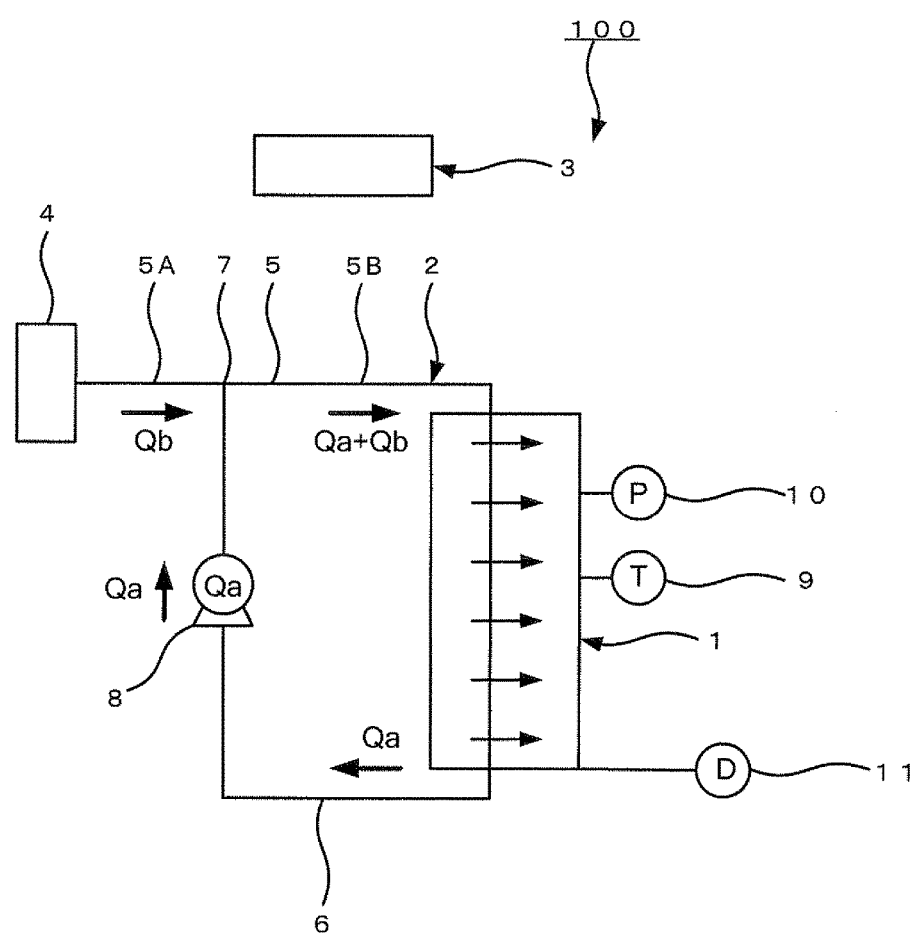
FIG. 4 is a view showing an illustrative embodiment of a first fuel cell system, embodiment 100.

FIG. 4 is a view showing an illustrative embodiment of the first fuel cell system of the present invention, fuel cell system 100.

Fuel cell system 100 comprises at least fuel cell 1 which generates electricity by supply of reaction gas, fuel gas piping system 2, an oxidant gas piping system (not shown) and controller 3 which integrally controls the fuel cell system.

The fuel cell system of the present invention comprises the oxidant gas piping system which supplies oxidant gas to the fuel cell and discharges gas (discharged oxidant gas) containing an unreacted oxidant component, water vapor and so on from the fuel cell. However, in the present invention, no particular limitation is imposed on the embodiment of the supply and discharge of the oxidant gas as long as the fuel cell is a counter-flow type fuel cell in which the flow direction of fuel gas which flows through the fuel gas channel and the flow direction of oxidant gas which flows through the oxidant gas channel are opposite. The oxidant gas piping system is omitted in the figures of the present invention, therefore.

Fuel cell 1 is composed of a solid polymer electrolyte fuel cell. In general, it has a stack structure in which a plurality of single fuel cells is stacked, and it generates electricity when supplied with oxidant gas and fuel gas. Oxidant gas and fuel gas are supplied to and discharged from fuel cell 1 through the oxidant gas piping system and fuel gas piping system 2. A detailed description of the fuel cell will be given below, using air containing oxygen as oxidant gas and hydrogen-containing gas as fuel gas.

Figure 5:
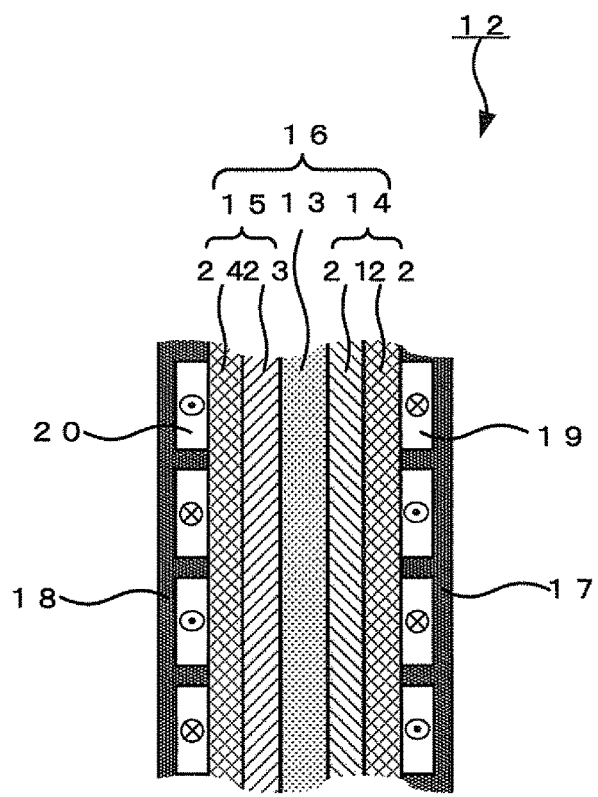
FIG. 5 is a sectional view showing a structural example of a single fuel cell in the first fuel cell system.

FIG. 5 is a schematic sectional view of single fuel cell 12 comprising fuel cell 1.

Single fuel cell 12 has a membrane electrode assembly 16 as the basic structure, in which solid polymer electrolyte membrane 13 is sandwiched between cathode electrode (air cathode) 14 and anode electrode (fuel electrode) 15. Cathode electrode 14 has a structure in which cathode catalyst layer 21 and gas diffusion layer 22 are stacked in this order from closest to electrolyte membrane 13, while anode electrode 15 has a structure in which anode catalyst layer 23 and gas diffusion layer 24 are stacked in this order from closest to electrolyte membrane 13.

Both sides of membrane electrode assembly 16 are sandwiched between a pair of separators 17 and 18 so that cathode electrode 14 and anode electrode 15 are sandwiched between the pair of separators 17 and 18. In separator 17 on the cathode side, a groove that forms an oxidant gas channel for supplying oxidant gas to cathode electrode 14 is provided, and oxidant gas channel 19 is defined by the groove and cathode electrode 14. In separator 18 on the anode side, a groove that forms a fuel gas channel for supplying fuel gas to anode electrode 15 is provided, and fuel gas channel 20 is defined by the groove and the anode.

Oxidant gas channel 19 and fuel gas channel 20 are disposed so that the flow direction of the oxidant gas that flows through oxidant gas channel 19 and the flow direction of the fuel gas that flows through fuel gas channel 20 are opposite (that is, a so-called counter-flow structure). In FIG. 5, a symbol of "circle with a dot" in oxidant gas channel 19 and fuel gas channel 20 refer to a gas flow direction to this side of the page showing FIG. 5 from the other side of the page, and a symbol of "circle with a cross mark" refer to a gas flow direction to the other side of the page showing FIG. 5 from this side of the page. Moreover, although it is not specifically shown in the figure, a region around the inlet of oxidant gas channel 19 and a region around the outlet of fuel gas channel 20 are disposed to sandwich electrolyte membrane 1, while a region around the outlet of oxidant gas channel 19 and a region around the inlet of fuel gas channel 20 are disposed to sandwich electrolyte membrane 1. In FIG. 5, the gas channels are drawn as a serpentine channel each; however, the form of the gas channels is not particularly limited and the gas channels can be in any form as long as they have a counter-flow structure.

Members constituting the fuel cell are not particularly limited. Each of the members may be one which is formed with general materials and has a general structure.

Fuel cell 1 has temperature sensor (temperature measuring means) 9 which measures temperature T of fuel cell 1. Temperature sensor 9 may be one which directly measures the temperature inside the fuel cell, or one which measures the temperature of a heat exchange medium that flows inside the fuel cell.

Pressure sensor 10 is installed in fuel cell 1, which measures the pressure of the fuel gas that flows through the fuel gas channel. The installation position of the pressure sensor is not specifically limited as long as it can measure the pressure of the fuel gas in the fuel gas channel at a desired position. For example, an inlet pressure sensor for measuring the pressure of the fuel gas at the inlet is installed in the inlet of the fuel gas channel, while an outlet pressure sensor for measuring the pressure of the fuel gas at the outlet is installed in the outlet of the fuel gas channel. Then, the average of fuel gas inlet pressure $P_{in}$ and fuel gas outlet pressure $P_{out}$ detected by the pressure sensors can be detected and controlled as the fuel gas pressure. The installation position is not limited to the inlet and outlet of the fuel gas channel. Pressure sensors can be installed in several positions of the fuel gas channel, and fuel gas pressures can be detected at the positions and controlled. Or, an average can be calculated from the detected fuel gas pressures and controlled as the pressure of the fuel gas. Only one pressure sensor can be installed in the fuel cell. Also, the pressure of the fuel gas can be estimated by a pressure sensor installed on the outside of the fuel gas channel.

In addition, fuel cell 1 has dew-point meter (water vapor amount measuring means) 25, which measures water vapor amount S in the fuel gas at the outlet of the fuel gas channel. The dew-point meter can be installed in fuel gas piping system 2 as long as it can detect fuel gas outlet water vapor amount S.

Fuel gas piping system 2 comprises hydrogen tank 4, fuel gas supply path 5 and fuel gas circulating path 6. Hydrogen tank 4 is a hydrogen gas source in which high-pressure hydrogen gas (fuel component) is stored, and is a fuel supply means. As the fuel supply means, for example, instead of hydrogen tank 4, there can be employed a reformer which produces hydrogen-rich reformed gas from hydrocarbon fuel, and a hydrogen storage alloy-containing tank in which reformed gas produced by the reformer is accumulated at high pressure.

Fuel gas supply path 5 is a path for supplying hydrogen gas (fuel component) to fuel cell 1 from hydrogen tank 4 (fuel supply means) and is composed of main path 5A and mixing path 5B. Main path 5A is located upstream of connecting part 7 which connects fuel gas supply path 5 with fuel gas circulating path 6. Main path 5A can be provided with a shutoff valve (not shown) which functions as a main valve of hydrogen tank 4, a regulator which reduces the pressure of hydrogen gas, etc. Flow rate $Q_b$ of the hydrogen gas (the flow rate of fuel component gas) supplied from hydrogen tank 4 (the flow rate of fuel component gas) is controlled based on a required output for the fuel cell, and the required output is secured. Mixing path 5B is located downstream of connecting part 7 and leads mixed gas of the hydrogen gas from hydrogen tank 4 and the discharged fuel gas from fuel gas circulating path 6 to the fuel gas channel inlet of fuel cell 1.

Fuel gas circulating path 6 recirculates the discharged fuel gas discharged from the fuel gas channel outlet of fuel cell 1 to fuel gas supply path S. Fuel gas circulating path 6 is provided with recirculation pump 8 for recirculating the discharged fuel gas to fuel gas supply path 5. As a result of hydrogen consumption by the fuel cell for electricity generation, the flow rate and pressure of the discharged fuel gas are lower than those of the fuel gas supplied to the fuel cell. Therefore, the flow rate and pressure of the discharged fuel gas are appropriately controlled by the recirculation pump to pump the discharged fuel gas to connecting part 7. The system composed of fuel gas circulating path 6, fuel gas supply path 5 and the fuel gas channel(s) in fuel cell 1 constitutes a circulation system which circulates and supplies fuel gas to the fuel cell.

The discharged fuel gas discharged from fuel cell 1 contains water produced by electricity generation reaction of the fuel cell, nitrogen gas transferred to the anode electrode side from the cathode electrode of the fuel cell through the electrolyte membrane (cross leaking), unconsumed hydrogen gas, etc. On fuel gas circulating path 6, a gas-liquid separator (not shown) can be installed on the upstream side of recirculation pump 8. The gas-liquid separator separates water and gas (such as unconsumed hydrogen gas) contained in the discharged fuel gas. Also on fuel gas circulating path 6, a discharged fuel gas pressure regulator (not shown) can be installed on the upstream side of recirculation pump 8, which discharges part of the discharged fuel gas to the outside of the fuel cell and adjusts the pressure of the discharged fuel gas to be recirculated.

From the viewpoint of efficient use of the hydrogen gas (fuel component), the fuel gas piping system preferably has a circulation system comprising a fuel gas circulating path, a recirculation pump, etc.; however, it can be provided with no circulation system or with a dead-end structure.

The oxidant gas piping system comprises an oxidant gas supply path which supplies oxidant gas to fuel cell 1, an oxidant gas discharge path which discharges discharged oxidant gas from fuel cell 1, and a compressor. The compressor is installed on the oxidant gas supply path. Air taken from the atmosphere by the compressor flows through the oxidant gas supply path and is pumped and supplied to fuel cell 1. The discharged oxidant gas discharged from fuel cell 1 flows through the oxidant gas discharge path and discharged to the outside of the fuel cell.

The operation of the fuel cell system is controlled by controller 3. Controller 3 is a microcomputer which comprises CPU, RAM, ROM and so on installed therein. In accordance with various kinds of programs and maps stored in ROM, RAM and so on, CPU executes various sorts of processing and control of various kinds of valves and pumps, the fuel gas piping system, the oxidant gas piping system, the heat exchange medium circulation system, etc., based on a required output for the fuel cell (output current density, that is, size of the load connected to the fuel cell) and results measured by several sensors connected to the fuel cell such as a temperature sensor, a gas pressure sensor, a gas flow sensor and a dew-point meter.

A main feature of fuel cell system 100 of the present invention is that controller 3 has the water vapor amount control means which controls the fuel gas outlet water vapor amount based on the target value of the fuel gas outlet water vapor amount which is preliminarily set based on the relationship between the voltage of fuel cell 1 and the fuel gas outlet water vapor amount.

In the present invention, a water vapor amount at the outlet of the fuel gas channel (fuel gas outlet water vapor amount) means the water vapor amount contained in the fuel gas which passes through the outlet of the fuel gas channel.

Specifically, in the operation of fuel cell 1, the water vapor amount control means of controller 3 detects temperature T of fuel cell 1 by temperature sensor 9.

Controller 3 detects pressure P of the fuel gas in the fuel gas channel by pressure sensor 10.

Also, controller 3 detects water vapor amount S of the fuel gas at the fuel gas channel outlet by dew-point meter 11.

Controller 3 controls flow rate Q of the fuel gas based on the detected temperature T and pressure P so that the detected fuel gas outlet water vapor amount S is brought closer to target value $S_t$. Target value $S_t$ is preliminarily obtained based on the correlation between fuel gas outlet water vapor amount S and the fuel cell voltage. Flow rate Q of the fuel gas is the flow rate of the fuel gas which flows through the fuel gas channel.

In particular, fuel gas flow rate Q of the fuel cell can be controlled by, for example, controlling flow rate $Q_a$ of the discharged fuel gas recirculated by recirculation pump 8. In the case of the circulation system which circulates the discharged fuel gas as with fuel cell system 100, by controlling flow rate $Q_a$ of the discharged fuel gas recirculated by recirculation pump 8 and not by controlling flow rate $Q_b$ of the fuel component gas supplied from hydrogen pump 4 (fuel source) by a water vapor amount control means, it is possible to sufficiently secure a required output and, further, to increase the use efficiency of hydrogen (fuel component) and to effectively control water distribution in the fuel cell.

The control of fuel gas flow rate Q by the water vapor amount control means is not limited to the control by the above $Q_a$, and it is not particularly limited as long as a required output for the fuel cell is secured. For example, the fuel gas flow rate can be controlled by controlling $Q_b$ only, or by controlling both $Q_a$ and $Q_b$, with securing a required output. It is also possible to use other means which can control the fuel gas flow rate.

In the present embodiment, the target value of the fuel gas water vapor amount is calculated based on the preliminarily-obtained relationship between the fuel gas outlet water vapor amount and fuel cell voltage, and the flow rate of the fuel gas, the pressure of the fuel gas and the temperature of the fuel cell can be controlled so as to achieve the thus-calculated water vapor amount. In particular, the moisture state inside the fuel cell and, further, the voltage of the fuel cell can be controlled by a feedforward control. By performing such a feedforward control, a fuel cell operation control which prevents the occurrence of a dry-up and provides high voltage can be achieved, by comparison with the case where the feed back control which actually detects the voltage of the fuel cell to determine the moisture state inside the fuel cell is performed. Furthermore, in the present invention, a voltage sensor and resistance sensor can be omitted, so that it can further simplify the control in the fuel cell system and reduce the cost of the fuel cell.

During the operation of the fuel cell, the water vapor amount control process by the water vapor amount control means may be periodically executed, or it may be executed only under the condition that the temperature of the fuel cell is higher than a given temperature. For example, it may be executed only under high-temperature condition that the dry-up is particularly likely to occur (e.g., under the condition of a temperature of 80° C. or more). The water vapor amount control process is preferably executed at least at 70° C. or more, and further, at 80° C. or more, since the dry-up is particularly likely to occur.

In addition, the preliminarily-obtained target value of the fuel gas water vapor amount may be defined by a water vapor amount at one point at which the peak voltage can be obtained, or it may be defined by a range of the water vapor amount having a given range containing the water vapor amount in which the peak voltage can be obtained.

In the specific water vapor amount control process of fuel cell system 100, the fuel gas outlet water vapor amount is controlled by controlling flow rate Q of the fuel gas (specifically, discharged fuel gas flow rate $Q_a$). However, a controlled parameter for bringing fuel gas outlet water vapor amount S closer to target water vapor amount $S_t$ is not limited to flow rate Q of the fuel gas. For example, at least one of the flow rate of the fuel gas, the pressure of the fuel gas and the temperature of the fuel cell can be selected. It is particularly preferable to control at least one of the fuel gas flow rate and fuel gas pressure among the fuel gas flow rate, fuel gas pressure and fuel cell temperature, since the control is easy and response to the control of the water vapor amount and average flow rate is quick. In particular, only flow rate Q of the fuel gas or pressure P of the fuel gas, or both flow rate Q and pressure P of the fuel gas can be controlled. The fuel gas pressure is also changed with the control of the fuel gas flow rate. Therefore, it is expected that the fuel gas outlet water vapor amount can be brought closer to the target value of the water vapor amount more efficiently by controlling both the fuel gas flow rate and fuel gas pressure.

The fuel gas pressure can be controlled by, for example, controlling the pressure of the fuel gas at the inlet of the fuel gas channel and/or the pressure of the fuel gas at the outlet of the fuel gas channel. In particular, the fuel gas pressure can be controlled by a back pressure valve installed on the downstream side of the fuel gas channel outlet, a regulator for supplying hydrogen to the fuel cell from the hydrogen tank, or, in the case where the fuel gas piping system is a circulation system, an injector for supplying hydrogen to the piping system from the hydrogen tank or a circulation pump installed in the piping system.

Hereinafter, fuel cell system 101 will be described with reference to FIG. 6, which is an illustrative embodiment of the first fuel cell system of the present invention.

Figure 6:
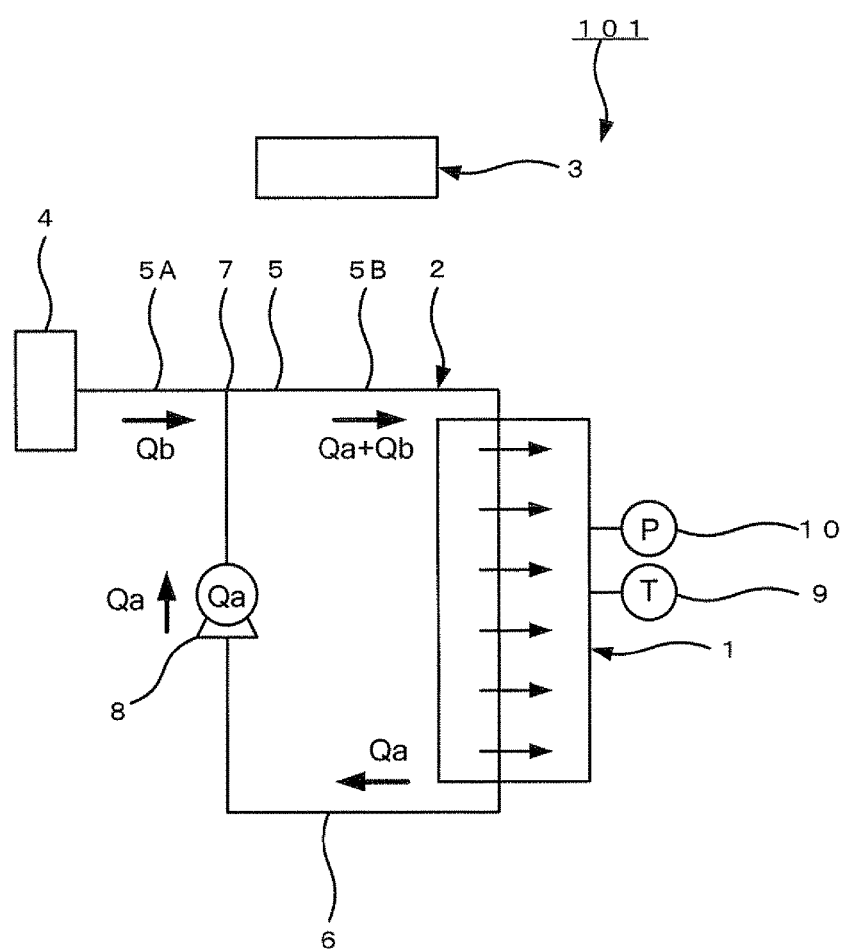
FIG. 6 is a view showing an illustrative embodiment of the first fuel cell system, embodiment 101.

Fuel cell system 101 shown in FIG. 6 has the same structure as that of fuel cell system 100, except that it does not have dew-point meter 11 and the specific water vapor amount control process by the water vapor amount control means of controller 3 is different.

Fuel cell system 101 will be described hereinafter, focusing on the differences with fuel cell system 100.

In fuel cell system 101, the water vapor amount control means controls at least one of the flow rate of the fuel gas, the pressure of the fuel gas and the temperature of the fuel cell, based on the map obtained based on the correlation between the target value of the fuel gas outlet water vapor amount and at least one of the temperature of the fuel cell 1 and the flow rate and pressure of the fuel gas in fuel cell 1. The target value of the fuel gas outlet water vapor amount is preliminarily set based on the relationship between the voltage of fuel cell 1 and the water vapor amount at the outlet of the fuel gas channel.

Fuel cell system 100 described above actually detects the fuel gas outlet water vapor amount by the dew-point meter and controls the fuel gas flow rate, etc. based on the detected fuel gas outlet water vapor amount. On the other hand, in fuel cell system 101, at least one of a flow rate of the fuel gas, pressure of the fuel gas and a temperature of the fuel cell, which achieves the preliminarily-obtained target value of the fuel gas outlet water vapor amount, is also preliminarily obtained. Then, the fuel gas outlet water vapor amount is controlled so as to be the set target value by controlling at least one of the flow rate of the fuel gas, the pressure of the fuel gas and the temperature of the fuel cell, based on the obtained fuel gas flow rate, fuel gas pressure and fuel cell temperature. That is, fuel cell system 101 does not have the fuel gas outlet water vapor amount measuring means such as the dew-point meter; therefore, it is possible to simplify the system compared with fuel cell system 100.

In particular, in the operation of fuel cell 1, the water vapor amount control means of controller 3 detects temperature T of fuel cell 1 by temperature sensor 9.

Controller 3 detects pressure P of the fuel gas in the fuel gas channel by pressure sensor 10.

Controller 3 controls flow rate Q of the fuel gas based on the detected temperature T and pressure P so that fuel gas outlet water vapor amount S is brought closer to preliminarily-obtained target value $S_t$. Target value $S_t$ is preliminarily obtained based on the correlation between fuel gas outlet water vapor amount S and the fuel cell voltage. Also, target value $Q_t$ is calculated using the map obtained based on the correlation between target value $S_t$ of the fuel gas outlet water vapor amount and temperature T, fuel gas pressure P and fuel gas flow rate Q, and flow rate Q of the fuel gas is controlled in response to the thus-calculated target value.

In particular, fuel gas flow rate Q of the fuel cell can be controlled by controlling flow rate $Q_a$ of the discharged fuel gas recirculated by recirculation pump 8 as with fuel cell system 100. As described above, by controlling flow rate $Q_a$ of the discharged fuel gas recirculated by recirculation pump 8 and not by controlling flow rate $Q_b$ of the fuel component gas supplied from hydrogen pump 4 (fuel source) by a water vapor amount control means, it is possible to sufficiently secure a required output and, further, to increase the use efficiency of hydrogen (fuel component) and to effectively control water distribution in the fuel cell. The control of fuel gas flow rate Q by the water vapor amount control means is not limited to the control by the above $Q_a$, and it is not particularly limited as long as a required output for the fuel cell is secured. For example, the fuel gas flow rate can be controlled by controlling $Q_b$ only, or by controlling both $Q_a$ and $Q_b$, with securing a required output. It is also possible to use other means which can control the fuel gas flow rate.

In order to control the water vapor amount with higher accuracy, the map is preferably obtained based on the correlation between the target value of the fuel gas outlet water vapor amount and at least two of the flow rate of the fuel gas, the pressure of the fuel gas and the temperature of the fuel cell, particularly, based on the correlation between the target value and all of the flow rate of the fuel gas, the pressure of the fuel gas and the temperature of the fuel cell.

In addition, the map obtained based on the correlation between target value $S_t$ of the fuel gas water vapor amount and at least one of temperature T, fuel gas pressure P and fuel gas flow rate Q may be one representing the correlation between target value $S_t$ of the fuel gas water vapor amount and at least one of temperature T, fuel gas pressure P and fuel gas flow rate Q.

Hereinafter, the second fuel cell system of the present invention will be described. The second fuel cell system of the present invention will be described, focusing on the differences with the first fuel cell system of the present invention.

Figure 7:
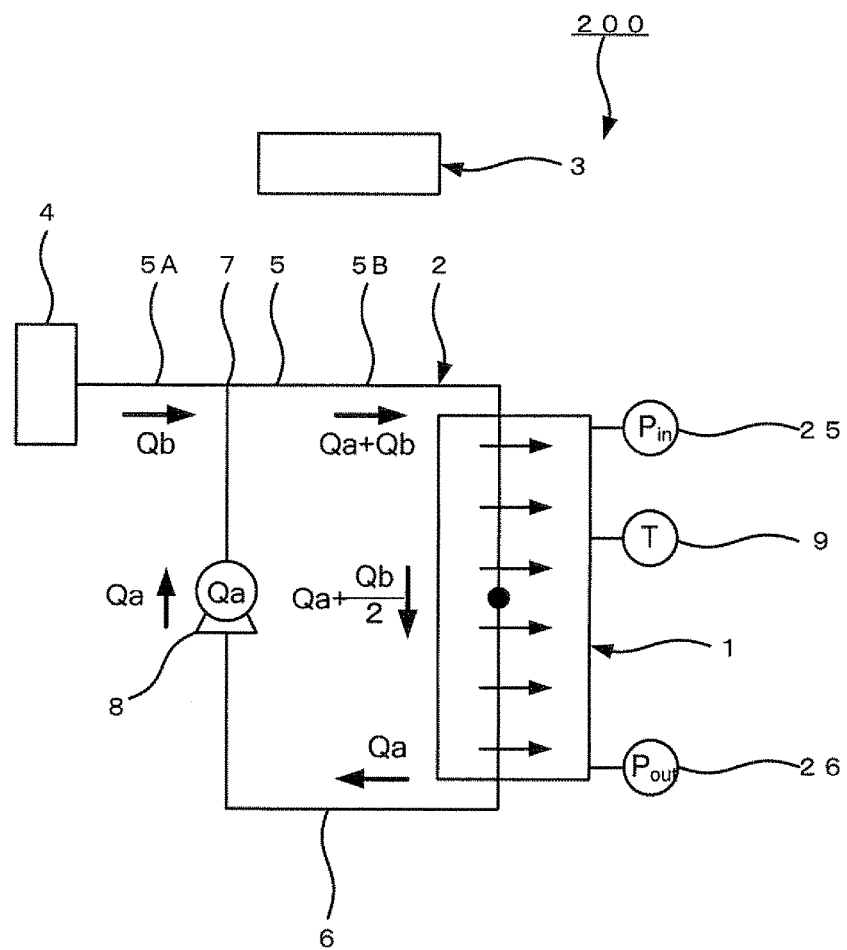
FIG. 7 is a view showing an illustrative embodiment of a second fuel cell system, embodiment 200.

FIG. 7 shows fuel cell system 200 which is an illustrative embodiment of the second fuel cell system of the present invention.

Fuel cell system 200 has the same structure as that of fuel cell system 101, except that it has inlet pressure sensor (fuel gas channel inlet pressure measuring means) 25 for measuring pressure $P_{in}$ of the fuel gas at the inlet of the fuel gas channel and outlet pressure sensor (fuel gas channel outlet pressure measuring means) 26 for measuring pressure $P_{out}$ of the fuel gas at the outlet of the fuel gas channel as the fuel gas pressure measuring means for measuring the pressure of the fuel gas in the fuel cell, and controller 3 has the average flow rate control means which controls the fuel gas average flow rate based on the target value of the fuel gas average flow rate which is preliminarily set based on the relationship between the voltage of fuel cell 1 and the fuel gas average flow rate.

As with fuel cell system 101, the installation position of the pressure sensor is not specifically limited as long as it can measure the pressure of the fuel gas in the fuel gas channel at a desired position, so that fuel cell system 200 may not be provided with inlet pressure sensor and outlet pressure sensor.

In fuel cell system 200, the average flow rate control means controls at least one of flow rate Q of the fuel gas, pressure P of the fuel gas and the temperature of the fuel cell, based on the map obtained based on the correlation between the target value $Q_{avet}$ of the fuel gas average flow rate and at least one of the temperature of the fuel cell 1 and the flow rate and pressure of the fuel gas in fuel cell 1. The target value $Q_{avet}$ of the fuel gas average flow rate is preliminarily set based on the relationship between the fuel cell voltage and average flow rate $Q_{ave}$ of the fuel gas (fuel gas average flow rate) in the fuel gas channel.

In fuel cell system 200, at least one of the flow rate of the fuel gas, the pressure of the fuel gas and the temperature of the fuel cell, which achieves the preliminarily-obtained target value of the fuel gas average flow rate, is also preliminarily obtained. Then, the fuel gas average flow rate is controlled so as to be the set target value by controlling at least one of the flow rate of the fuel gas, the pressure of the fuel gas and the temperature of the fuel cell, based on the obtained fuel gas flow rate, fuel gas pressure and fuel cell temperature.

In particular, in the operation of fuel cell 1, the average flow rate control means of controller 3 detects temperature T of fuel cell 1 by temperature sensor 9 in fuel cell system 200.

Controller 3 calculates average pressure $P_{ave}$ [$P_{ave}=(P_{in}+P_{out})/2$] in the fuel gas channel, based on pressure $P_{in}$ of the fuel gas at the inlet of the fuel gas channel and pressure $P_{out}$ of the fuel gas at the outlet of the fuel gas channel, which are detected by pressure sensors 25 and 26.

Controller 3 controls flow rate Q of the fuel gas based on the detected temperature T and calculated average pressure $P_{ave}$ so that fuel gas average flow rate $Q_{ave}$ is brought closer to preliminarily-obtained target value $Q_{avet}$. Target value $Q_{avet}$ is preliminarily obtained based on the correlation between fuel gas average flow rate $Q_{ave}$ and the fuel cell voltage. Target value $Q_{avet}$ is calculated using the map obtained based on the correlation between target value $Q_{avet}$ of the fuel gas average flow rate and temperature T, fuel gas pressure P and fuel gas flow rate Q, and average flow rate $Q_{ave}$ of the fuel gas is controlled in response to the thus-calculated target value.

In particular, fuel gas flow rate Q of the fuel cell can be controlled by controlling flow rate $Q_a$ of the discharged fuel gas recirculated by recirculation pump 8 as with fuel cell system 100. As described above, by controlling flow rate $Q_a$ of the discharged fuel gas recirculated by recirculation pump 8 and not by controlling flow rate $Q_b$ of the fuel component gas supplied from hydrogen pump 4 (fuel source), it is possible to sufficiently secure a required output and, further, to increase the use efficiency of hydrogen (fuel component) and to effectively control water distribution in the fuel cell by controlling the average flow rate of the fuel gas. The control of fuel gas flow rate Q by the average flow rate control means is not limited to the control by the above $Q_a$, and it is not particularly limited as long as a required output for the fuel cell is secured. For example, the fuel gas flow rate can be controlled by controlling $Q_b$ only, or by controlling both $Q_a$ and $Q_b$, with securing a required output. It is also possible to use other means which can control the fuel gas flow rate.

In order to control the fuel gas average flow rate with higher accuracy, the map is preferably obtained based on the correlation between the target value of the fuel gas average flow rate and at least two of the flow rate of the fuel gas, the pressure of the fuel gas and the temperature of the fuel cell, particularly, based on the correlation between the target value and all of the flow rate of the fuel gas, the pressure of the fuel gas and the temperature of the fuel cell.

In addition, the map obtained based on the correlation between target value $Q_{avet}$ of the fuel gas average flow rate and at least one of temperature T, fuel gas pressure P and fuel gas flow rate Q may be one representing the correlation between target value $Q_{avet}$ of the fuel gas average flow rate and at least one of temperature T, fuel gas pressure P and fuel gas flow rate Q.

In the second fuel cell system of the present invention, average flow rate $Q_{ave}$ of the fuel gas (fuel gas average flow rate) in the fuel gas channel is the average flow rate of the fuel gas which flows through the fuel gas channel, and the calculation method thereof is not particularly limited. For example, in the case where the fuel gas piping system is a circulation system as with fuel cell system 200, fuel gas average flow rate $Q_{ave}$ can be calculated by the following formula (1):

$$Q_{ave}=Q_a+Q_b/2 \qquad \text{Formula (1)}$$

$Q_{ave}$: Average flow rate of fuel gas in fuel gas channel
$Q_a$: Flow rate of the discharged fuel gas recirculated by the recirculation pump
$Q_b$: Flow rate of the fuel component gas supplied from the fuel supply means In the above formula (1), average flow rate $Q_{ave}$ of the fuel gas is calculated based on the assumption that half of flow rate $Q_b$ of the fuel component gas supplied from the fuel supply means in accordance with a required output is consumed in the middle of the overall length of the fuel gas channel.

Figure 8:
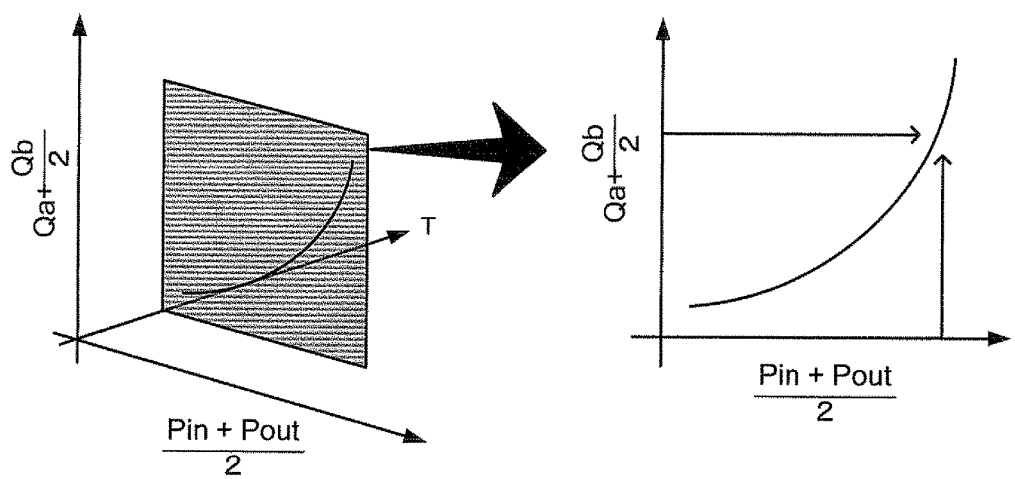
FIG. 8 is an image view showing a map example used in the second fuel cell system.

FIG. 8 shows an example of the map used in the average flow rate control process based on fuel gas average flow rate $Q_{ave}$ calculated by the above formula (1).

The map shown in FIG. 8 represents the correlation between the detected temperature T, average pressure $P_{ave}$ [Pave=$(P_{in}+P_{out})/2$] and target value $Q_{avet}$ of the fuel gas average flow rate. Therefore, target average flow rate $Q_{avet}$ at the detected average pressure $P_{ave}$ is calculated, for example, in accordance with the map representing the correlation between average pressure $P_{ave}$ and average flow rate $Q_{avet}$ at the detected temperature T. Discharged fuel gas flow rate $Q_a$ can be controlled so that $Q_{ave}$ calculated by formula (1) can be $Q_{avet}$ calculated by the map.

Also, in the second fuel cell system of the present invention, fuel gas average flow rate $Q_{ave}$ can be calculated by the following formula (2):

$$Q_{ave}=nRT/P \quad \text{Formula (2)}$$

$Q_{ave}$: Average flow rate of the fuel gas in the fuel gas channel
n: Number of moles of the fuel gas in the middle of the overall length of the fuel gas channel
R: Gas constant
T: Fuel cell temperature
P: Pressure of the fuel gas in the middle of the overall length of fuel gas channel In the above formula (2), the fuel gas flow rate in the middle of the overall length of the fuel gas channel is used as fuel gas average flow rate $Q_{ave}$. Fuel gas average flow rate $Q_{ave}$ is calculated from the number of moles and pressure of the fuel gas in the middle of the overall length of the fuel gas channel, based on the equation of state of gas.

In formula (2), the number of moles of the fuel gas is a number of moles of the whole components contained in the fuel gas (nitrogen gas, hydrogen gas, water vapor and so on) in the middle of the overall length of the fuel gas channel. In particular, it is obtained by subtracting the number of moles of the fuel component which is consumed until it reaches the middle of the overall length of the fuel gas channel from the total number of moles of the fuel gas at the inlet of the fuel gas channel. The number of moles of the fuel component which is consumed until it reaches the middle of the overall length of the fuel gas channel is half the amount of the fuel component which is needed based on a required output required for the fuel cell. Also, the total number of moles of the fuel gas at the inlet of the fuel gas channel is determined from the temperature and pressure of the total flow rate of the following: the flow rate of the fuel gas which is returned to the inlet of the fuel gas channel by the circulation pump and the flow rate of hydrogen which is additionally supplied from the hydrogen tank.

Also in formula (2), the pressure of the fuel gas can be one that is actually detected in the middle of the overall length of the fuel gas channel, or it can be the average calculated from pressures of the fuel gas which are measured at several positions of the overall length of the fuel gas channel. Or, the pressure of the fuel gas can be calculated based on the assumption that half of the pressure loss generated in the overall length of the fuel gas channel is caused in the middle the overall length of the fuel gas channel. The fuel gas pressure based on such an assumption of pressure loss can be calculated by the following formula (3):

$$P=(P_{in}+P_{out})/2 \quad \text{Formula (3)}$$

$P_{in}$: Pressure of the fuel gas at the fuel gas channel inlet
$P_{out}$: Pressure of the fuel gas at the fuel gas channel outlet In the case where the fuel gas piping system is a circulation system as with fuel cell system 200, average flow rate $Q_{ave}$ of the fuel gas can be calculated by the following formula (4) as a variation of formula (2):

$$Q_{ave}=n'RT/P \quad \text{Formula (4)}$$

$Q_{ave}$: Average flow rate of the fuel gas in the fuel gas channel
n': Number of moles of the fuel gas in the middle of the overall length of the fuel gas channel, which is calculated based on the assumption that of the fuel gas which is supplied to the fuel gas channel, half of the fuel component which is supplied to the fuel gas channel by the fuel gas supply means, is consumed.

R: Gas constant
T: Fuel cell temperature
P: Pressure of the fuel gas in the middle of the overall length of fuel gas channel, which is calculated by the formula (3)

In the second fuel cell system, other than the value calculated based on the above assumption, fuel gas average flow rate $Q_{ave}$ can be a value which is calculated by actually measuring the fuel rate of the fuel gas at several positions of the fuel gas channel and averaging them, or a flow rate of the fuel gas which is actually measured in the middle of the overall length of the fuel gas channel. From the point of view that the fuel cell system can be built easily, the fuel gas average flow rate is preferably calculated by formula (1), (2) or (4).

Also in the second fuel cell system, during the operation of the fuel cell, the fuel gas average flow rate control process by the average flow rate control means may be periodically executed, or it may be executed only under the condition that the temperature of the fuel cell is higher than a given temperature. For example, it may be executed only under high-temperature condition that the dry-up is particularly likely to occur (e.g., under the condition of a temperature of 80° C. or more). The fuel gas average flow rate control process is preferably executed at least at 70° C. or more, and further, at 80° C. or more, since the dry-up is particularly likely to occur.

REFERENCE SIGNS LIST

1. Fuel cell
2. Fuel gas piping system
3. Controller
4. Hydrogen tank (Fuel supply means)
5. Fuel gas supply path
5A. Main path
5B. Mixing path
6. Fuel gas circulating path
7. Connecting part
8. Recirculation pump
9. Temperature sensor (Temperature measuring means)
10. Pressure sensor
11. Dew-point meter (Water vapor amount measuring means)
12. Single fuel cell
13. Polymer electrolyte membrane
14. Cathode electrode
15. Anode electrode
16. Membrane electrode assembly
17. Separator
18. Separator
19. Oxidant gas channel
20. Fuel gas channel
21. Cathode catalyst layer
22. Gas diffusion layer
23. Anode catalyst layer
24. Gas diffusion layer
25. Pressure sensor (fuel gas channel inlet pressure measuring means)
26. Pressure sensor (fuel gas channel outlet pressure measuring means)
100. Fuel cell system
101. Fuel cell system
200. Fuel cell system

The invention claimed is:
1. A fuel cell system configured to be operated under a non-humidified condition, comprising:

a fuel cell comprising:
a polymer electrolyte membrane sandwiched between an anode electrode and a cathode electrode,
a fuel gas channel disposed so as to face the anode electrode in order to supply the anode electrode with fuel gas containing at least a fuel component, and
an oxidant gas channel disposed so as to face the cathode electrode in order to supply the cathode electrode with oxidant gas containing at least an oxidant component,
wherein a flow direction of the fuel gas in the fuel gas channel and a flow direction of the oxidant gas in the oxidant gas channel are opposite; and
a controller including control logic configured to cause the controller to (i) have a target value of a water vapor amount at an outlet of the fuel gas channel that is preliminarily set based only on a relationship between a voltage of the fuel cell and the water vapor amount at the outlet of the fuel gas channel, and (ii) control the water vapor amount at the outlet of the fuel gas channel based on the target value of the water vapor amount,
wherein a peak voltage can be obtained when the water vapor amount discharged from the outlet of the fuel gas channel is from 0.02 mol/min to 0.067 mol/min at a fuel cell temperature of 70° C. or more, and
the fuel cell system does not include a meter configured to measure the water vapor amount at the outlet of the fuel gas channel.

2. The fuel cell system according to claim 1, wherein the controller is further configured to control at least one of a temperature of the fuel cell and a flow rate and pressure of the fuel gas in the fuel cell, based on the target value of the water vapor amount.

3. The fuel cell system according to claim 2, further comprising a fuel gas supply path which supplies the fuel component gas to the fuel gas channel from a fuel supply means, a fuel gas circulating path which recirculates fuel gas discharged from the fuel cell to the fuel gas supply path, and a recirculation pump which is installed in the fuel gas circulating path and recirculates the discharged fuel gas to the fuel gas supply path,
wherein the controller is further configured to control the flow rate of the fuel gas in the fuel cell by controlling the flow rate of the discharged fuel gas recirculated by the recirculation pump.

4. The fuel cell system according to claim 2, wherein the controller is further configured to control the pressure of the fuel gas at the inlet of the fuel gas channel and/or the pressure of the fuel gas at the outlet of the fuel gas channel, based on the target value of the water vapor amount.

5. The fuel cell system according to claim 1, wherein the controller is further configured to control the flow rate and/or pressure of the fuel gas in the fuel cell, based on the target value of the water vapor amount.

6. The fuel cell system according to claim 1, wherein the controller is further configured to control at least one of the temperature of the fuel cell and the flow rate and pressure of the fuel gas in the fuel cell, based on a map obtained based on a correlation between the target value of the water vapor amount and at least one of the fuel gas flow rate, fuel gas pressure and fuel cell temperature.

7. The fuel cell system according to claim 1, wherein the controller is configured to control the water vapor amount during operation of the fuel cell at a temperature of 80° C. or more.

* * * * *